2,968,782

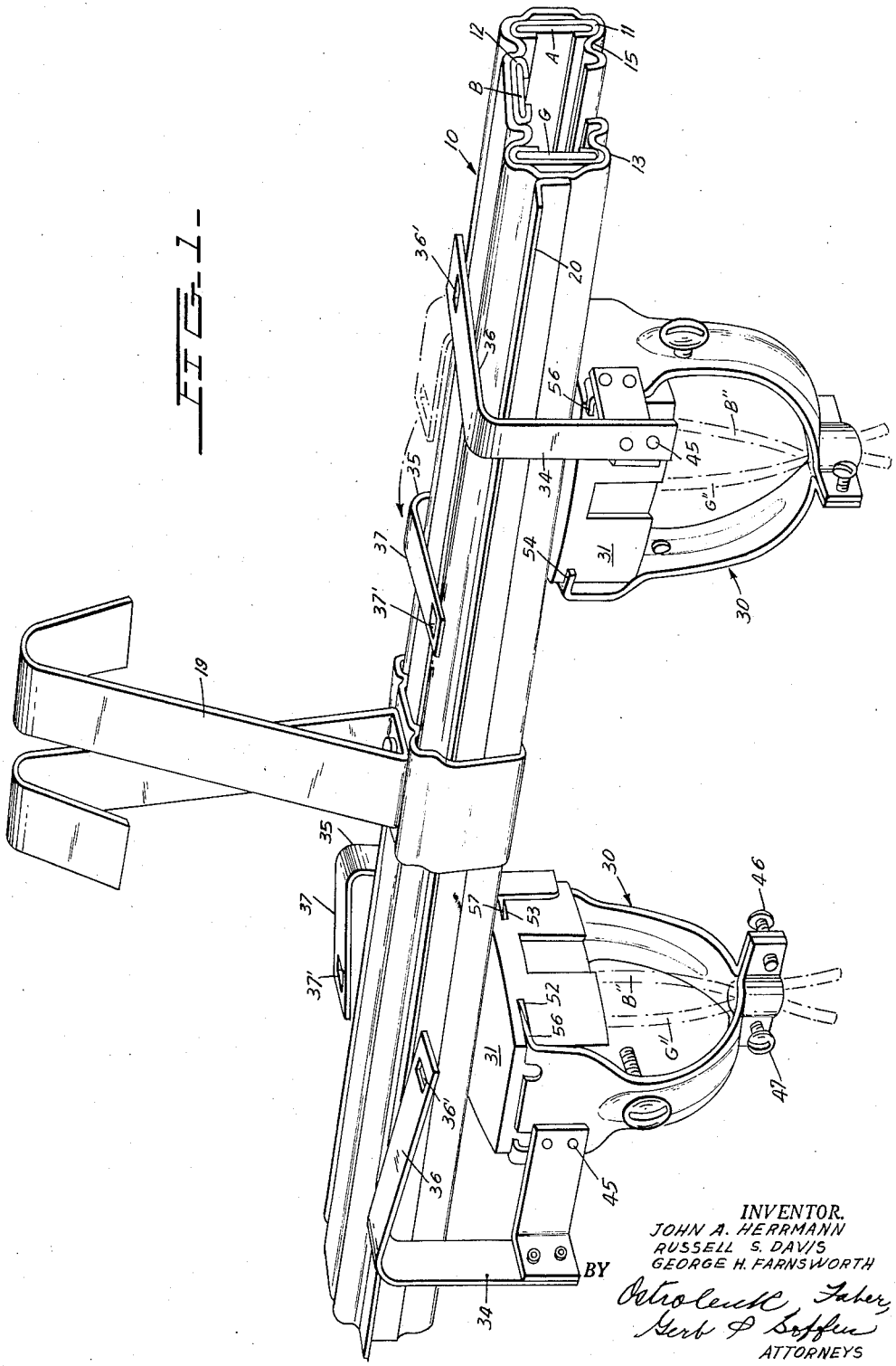

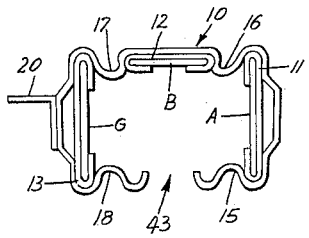
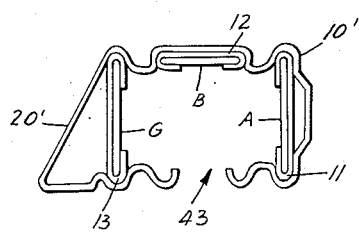
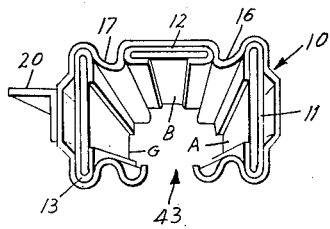
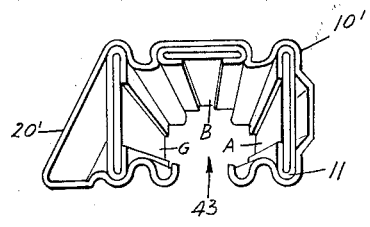
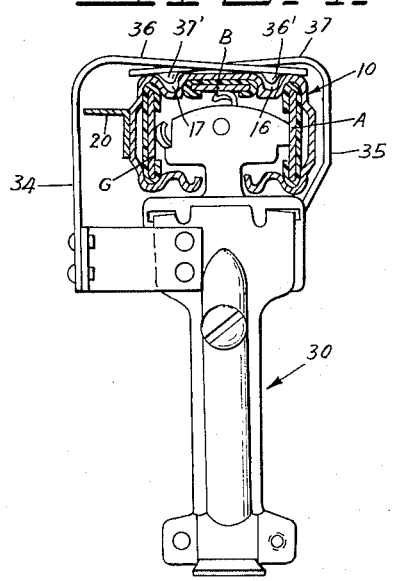

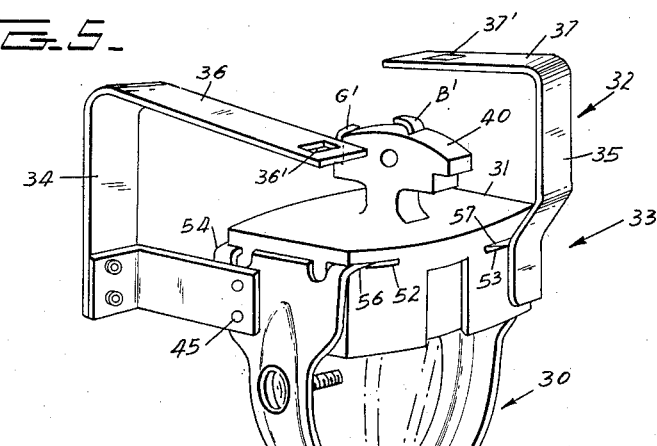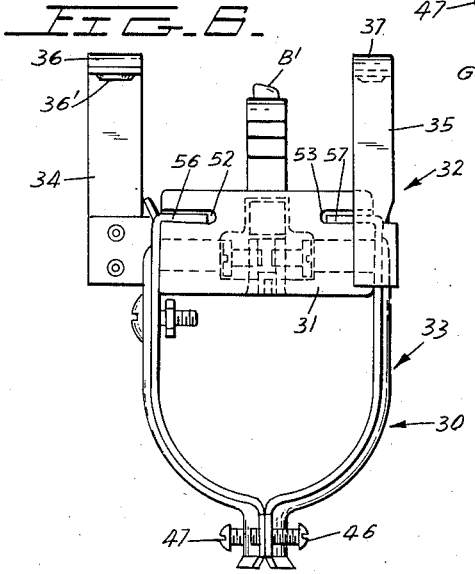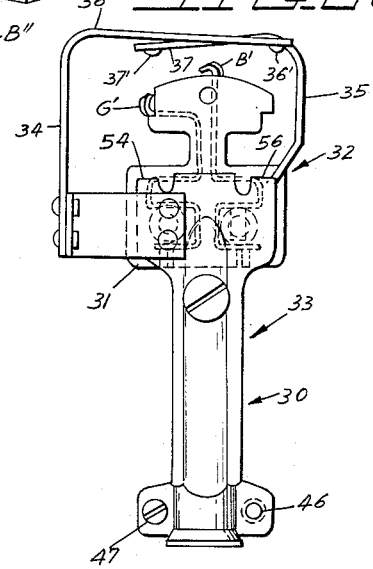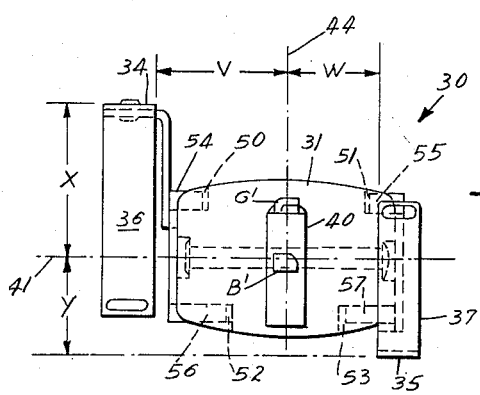

POLARIZED DUCT SYSTEM

John A. Herrmann, Grosse Pointe Farms, and George H. Farnsworth and Russell S. Davis, Detroit, Mich., assignors, by mesne assignments, to I-T-E Circuit Breaker Company, Philadelphia, Pa., a corporation of Pennsylvania Filed May 11, 1956, Ser. No. 584,342

1 Claim. (Cl. 339—22)

Our invention relates to a polarizing arrangement for trolley duct system, and more particularly is directed to a novel relationship of components wherein the components can be interconnected in only one predetermined manner to ensure that the entire arrangement is connected in only one predetermined manner. The type of trolley duct to which our invention is directed is shown in Patent 2,158,656 and the tap-off unit is shown generally in Patent 2,310,024, both of which are assigned to the assignee of the instant application.

In trolley duct system installations wherein one of the plurality of conductors is at neutral or ground potential, it is necessary to provide an arrangement wherein the neutral or ground terminal of the load is always connected to the neutral or ground bus of the trolley duct. Our invention is directed to an arrangement to ensure that the ground terminal of the load, which in turn corresponds to the ground terminal of the tap-off unit, can only be connected to the ground bus of the bus duct. By providing a novel polarized arrangement it is impossible for even an inexperienced operator to connect the tap-off units to the bus duct in any position other than the proper position. To this end we have provided an arrangement wherein the brackets of the tap-off units and the housing are so constructed that the tap-off unit can be connected to the housing in only one predetermined manner.

In one embodiment of our invention, a symmetrical housing is provided with a rib which extends from only one side thereof. The fastening section of the bracket for the tap-off unit has two legs which are spaced an unequal distance from a first center line of the tap-off unit and two feet which are spaced an unequal distance from a second center line of the tap-off unit. The leg and foot of the fastening portion of the tap-off bracket, which are positioned, respectively, furthest from the first and second center line, are positioned on the same side of the tap-off unit and, when the tap-off unit is connected to the bus duct housing, are on the same side as the rib of the housing. Since a portion of the molding of the tap-off unit initially centers the tap-off unit with respect to the housing, it is impossible for the operator to improperly connect the tap-off unit to the housing since the rib on the housing would act as a barrier to the leg and foot of the tap-off unit which are positioned the shortest distance from their respective center lines.

Thus, by providing a relationship between the spacing of the members of the fastening portion of the bracket and the housing with a rib on one side, it is possible to obtain polarization between the tap-off unit and the housing so that the tap-off unit can be connected in only one predetermined manner to the housing unit.

In order to achieve system polarization, it is also necessary that the tap-off unit be assembled in only one predetermined manner. To this end the contacts of the tap-off unit are contained within a molding which has recesses of unequal length to receive, respectively, extensions from the bracket of unequal length. Thus, the bracket can be secured to the molding in only one predetermined manner to thereby ensure polarization of the assembled tap-off unit.

In a second embodiment of our invention, the housing of the bus duct is asymmetrical thereby eliminating the necessity of a polarizing rib. In the asymmetrical housing arrangement, one side extends for a distance considerably greater than the other side from the center line of the buses. Thus, the same type of tap-off unit which is constructed for polarization with the symmetrical housing will also be polarized with respect to the asymmetrical housing arrangement.

With the asymmetrical housing arrangement, the sections of the bus duct can be connected to each other in only one predetermined manner. That is, since the unit sections are usually connected to each other by sliding one housing over the other, it would be impossible to interconnect adjacent housing sections in any other than a single predetermined manner. Thus, the asymmetrical housing would serve as the polarizing means as between adjacent sections since they could only be connected in one manner.

Thus, with our novel arrangement, the tap-off unit can be connected to the housing in only one predetermined manner, also the tap-off unit can be assembled in only one predetermined manner to thereby ensure polarization of the entire system, and when an asymmetrical housing is used, the adjacent sections can be assembled in only one predetermined manner. Thus, with our novel arrangement, a completely polarized trolley duct assembly is achieved.

Accordingly, a primary object of our invention is to provide a trolley duct assembly wherein the tap-off unit can be connected to the housing in only one predetermined manner.

Another object of our invention is to provide a trolley duct arrangement in which the tap-off unit and the housing are constructed to prevent the connection of the tap-off unit to the housing in any other than the predetermined manner.

Still another object of our invention is to provide a tap-off unit wherein corresponding portions of the bracket have unequal spacing to thereby prevent improper connection to either an asymmetrical housing of the bus duct or a symmetrical housing with a polarized rib.

A still further object of our invention is to provide a tap-off unit wherein the bracket can be secured to the molding in only one predetermined manner.

Another object of our invention is to provide a tap-off unit wherein the molding has recesses of unequal length corresponding respectively to protrusions of the bracket of unequal length to thereby permit connection between the two in only one predetermined manner.

Another object of our invention is to provide a trolley duct arrangement wherein the housing is asymmetrical to thereby permit the adjacent housing sections to be connected to each other in only one predetermined manner.

A still further object of our invention is to provide system polarization for a bus duct assembly wherein the housing of the bus duct and both the bracket and the molding of the tap-off unit are so constructed that both the individual components and the interconnection of the components can be achieved in only one predetermined manner.

These and other objects of our invention will become apparent from the following description when taken in connection with the drawings in which:

Figure 1 is a perspective view of a portion of our novel trolley duct illustrating the housing containing the three buses and also the manner in which the tap-off units are removably engaged thereto.

Figure 2 is an end view of the bus duct section of Figure 1. This figure shows a symmetrical housing with a polarizing rib.

Figure 2a is an end view similar to Figure 2 in perspective.

Figure 3 is an end view of a modification of the type of housing seen in Figure 1. This figure illustrates an asymmetrical housing thereby eliminating the necessity of a separate polarizing rim.

Figure 3a is an end view similar to Figure 3 in perspective.

Figure 4 is a cross-sectional view of the system seen in Figure 1 wherein a tap-off unit is engaged with the housing section.

Figure 5 is a perspective view of a tap-off unit. The tap-off unit of Figure 5 is a polarized device wherein the bracket is dimensioned so that the tap-off is polarized with respect to the housing and also with respect to the molding.

Figure 6 is a side view of the tap-off unit of Figure 5.

Figure 6a is an end view of the tap-off unit of Figure 5.

Figure 6b is a top view of the tap-off unit of Figure 5.

The universal trolley duct system is comprised of a housing section 10 which contains bus bars A, B and G. The housing 10 may be made of metal and formed so as to contain the three wire system comprised of the bus bars A, B and G. Each of the bus bars A, B and G is provided with an insulating shield 11, 12 and 13, respectively, so that each of the conductors are electrically independent. The housing, as seen in Figures 1, 2, 2a and 4, is provided with groove sections such as 15 and 16 which hold and secure bus bar A and its insulating member 11 in place, groove sections 16 and 17 which hold the bus bar B and its insulating member 12 in place and groove sections 17 and 18 which hold bus bar G and its insulating member 13 in place. The entire housing assembly can be supported in any desirable manner as, for example, by means of a bracket member 19 which straddles the housing 10 and supports it from any stationary member as for example a suspended wire.

In the embodiment of Figures 1, 2 and 4, the housing is a symmetrical member and is illustrated as a three wire system comprised of the conductors A, B and G. Although the embodiment illustrated could be used in a three wire system, there are many installations in which it is desirable to have one of the conductors at neutral or ground potential as for example conductor G. Thus, in a three wire system in which one conductor is at neutral or ground potential, it is essential to provide an arrangement whereby the corresponding ground or neutral terminal of the load is always connected to the ground or neutral conductors of the housing to prevent damages. To this end our invention is directed to a polarizing arrangement whereby there is only one predetermined manner in which the load can be energized from the universal trolley duct even though the operator who makes the removable connection or initial installation is unaware of the energization of the various conductors. With the symmetrical housing arrangement, seen in Figures 1, 2 and 4, a polarizing rib 20 is secured along the length of one side of the housing 10 except for the coupling space at each end, preferably on the side containing the ground or neutral conductor G. As will hereinafter be more fully explained, the brackets of the tap-off units, such as 30, are constructed so that both the legs and feet thereof are an unequal distance from their respective center lines so that the housing 10 can receive the tap-off unit 30 in only one predetermined manner due to the polarizing rib 20.

In some installations, it may be desirable to initially construct the housing so that instead of being symmetrical as in Figures 1, 2 and 4, therefore requiring a polarizing rib 20, to have an asymmetrical housing such as 10' as seen in Figures 3 and 3a. In this arrangement, one wall 20' of the housing 10' extends a further distance from the center line of the opening than does its opposite wall thereby functioning in the same manner as the polarizing rib 20.

The manner in which the brackets of the tap-off unit 30 engage and surround the housing 10 in a single predetermined manner, due to the polarizing rib 20, is illustrated in Figure 4. There it will be seen that the tap-off unit 30 is dimensioned so that it can be placed into electrical engagement with the bus bars B and G of the housing 10 when placed in a predetermined direction with respect thereto since the bracket will straddle the polarizing rib 20. As best seen in the perspective view of Figure 5 and detailed views of Figures 6, 6a and 6b, the tap-off unit 30 is comprised of a molded section 31 having an upper bracket portion 32 and a lower bracket portion 33. The upper bracket portion 32 is comprised of legs 34 and 35 having feet 36 and 37 extending in a direction perpendicular thereto. The molding section 31 has a protruding molding portion 40 containing electrical contacts B' and G'. One end of the conductors G'', B'' are connected to the load to be energized by the universal trolley duct system and the other end of these conductors is connected through the molding to the terminals G', B', respectively. As best seen in the side view of Figure 6 and the top view of Figure 6b, the legs 34, 35 of the upper bracket 32 are spaced an unequal distance from the center line of the molding 31. Thus, as seen in Figure 6b the leg 35 is positioned a distance Y from the center line 41 and the leg 34 is positioned a distance X from the center line 41, the leg 34 is positioned a distance V from the center line 44 and the leg 35 is positioned a distance W from the center line 44. The extension member 40 of the molding 31 is so constructed that it fits into the center opening 43 of the housing 10 when the tap-off unit 30 is initially placed in the housing 10, as seen in the left hand side of Figure 1. The housing 10 and its polarizing rib 20 are so constructed that the distance from the outside longitudinal edge of the polarizing rib 20 to the width center line 81 of the longitudinal opening 43 is greater than distances Y and W but less than the distances X and V, whereas the distance from the center line of the longitudinal opening 43 to the wall of the housing 10 containing the conductor A is less than the distances Y and W.

Hence, the tap-off unit 30 can be positioned so that the molded extension 40 can be placed within the longitudinal center opening 43 and the legs 34, 35 along with their respective feet 36, 37 can be moved up past the polarizing rib 20 as seen at the left of Figure 1. In the event the operator should attempt to place the tap-off unit 30 in electrical connection with the housing section 10 when the tap-off unit is 180° from the position seen at the left of Figure 1, the molded extension 40 could not be moved up into the central longitudinal opening 43 since the leg 35 and its foot 37 would be blocked by the polarizing rib 20. That is, since the outside longitudinal edge of the polarizing rib 20 is at a distance from the center line of the longitudinal opening 43 greater than the distance W, which is the spacing of the foot 37 from the center line 44, the polarizing rib 20 would serve as a barrier and thus the tap-off unit could not even initially be placed for positioning on the trolley duct section 10. It should be noted that the same condition above noted regarding the initial connection between the tap-off unit 30 and the housing section 10 would also apply to the modified arrangement seen in Figures 3 and 3a since the extending portion 20' would serve as a barrier in the event the tap-off unit 30 is not initially positioned properly by the operator.

After the tap-off unit 30 is initially placed in the position seen at the left of Figure 1, it is rotated 90° to the position seen at the right of Figure 1. As noted, it is the relationship of the rib 20 along with unequal spacing of the legs 34, 35 which result in the polarization between the tap-off unit 30 and the housing section 10. In the event the operator should improperly insert the tap-off unit 30 in the wrong position with respect to the housing 10 thereby forcing the foot 37 past the polarizing rib 20, a safety feature is provided so that the tap-off unit can not be rotated the 90° thereby preventing the electrical engagement between the contacts G', B' respectively and the conductors B, G. This safety feature is achieved by placing the legs 36, 37 an unequal distance from the center line 44. That is, the leg 36 is placed a distance V from the center line 44 whereas the leg 37 is placed a distance W from the center line 44. It will be noted, as seen in Figures 1 and 4, that the feet 36 and 37 are provided with an indentation or protrusion 36' and 37', respectively, which, when the tap-off unit is in electrical engagement with the section 10, fit into the longitudinal grooves 16 and 17 respectively. Thus, if the tap-off unit is properly inserted in the housing section 10, as seen in the left in Figure 1, and thereafter rotated 90° as seen at the right of Figure 1, the tap-off unit will properly straddle and surround the housing section 10 and be properly maintained in that position due to the engagement between the protrusions 36', 37' with the grooves 16, 17, respectively, of the housing section 10. In the event that the tap-off unit 30 is not properly initially inserted with respect to the section 10, the polarizing rib 20 will interfere with the foot 37, and furthermore, even if the operator should force the leg 35 past the polarizing rib he would not then be able to rotate the unit into position since the unequal spacing of the feet 36, 37 will not permit these members to be positioned so that the protrusions 36', 37' fit into the longitudinal recesses 16, 17, respectively. Thus, the unit can never be locked into position if it is initially improperly inserted. That is, the unequal spacing of the components of the upper bracket 32 combined with the polarizing rib 20 of the housing 10 permit cooperation between the components of the tap-off unit 30 and the bus duct section 10 only when the tap-off unit 30 is initially positioned in a single predetermined position and thereafter rotated 90°. In the event the operator inadvertently attempts to connect the tap-off unit in any position other than the predetermined position, there will be both interference of the various components and the unit can never be locked in position.

In addition to providing a polarizing arrangement between the tap-off unit 30 and the trolley duct system 10, it is also essential to provide a polarizing arrangement within the tap-off unit 30 since it is assembled from two main components. That is, since it is the dimensional arrangement of the upper bracket 32 with respect to the housing 10 which positions the contacts B', G' with respect to the conductors of the bus housing, it is essential that there be a predetermined relationship between the bracket 32—33 and the molding 31 of the tap-off unit 30 to ensure that the contacts B', G' are not reversed 180°. To this end, the molding 31 and the bracket 32—33 are dimensioned and constructed so that they can be assembled in only one predetermined manner. As best seen in Figures 5, 6, 6a and 6b, the bracket 32—33 has a right hand and left hand half. Thus, for example, as seen in Figure 6 the left hand half is comprised of the lower bracket and upper bracket having a leg and foot 34, 36 and the right hand portion is comprised of the lower bracket 33 and the leg and foot 35, 37. The upper portion 32 of the bracket is secured to the lower portion 33 in any desirable manner, as for example by means of rivets 45. The left hand and right hand half are secured to each other by a removable connection such as the screw arrangement 46, 47. In order to position the molding 31 with respect to the bracket 32—33, an arrangement is provided wherein recesses of the molding 31 receive protrusions from the bracket 32—33. The molding 31 is provided with four such recesses, 50, 51, 52, 53, and each half of the bracket 32—33 is provided with extensions 54, 55, 56, 57 which are received by the recesses 50, 51, 52, 53. The recesses 50, 51 as seen in Figure 6b are relatively short compared to the recesses 52, 53, and in like manner, the protrusions 54, 55 are relatively short compared to the protrusions 56, 57. Thus, the recesses 50, 51 are considerably shorter than the rest of the protrusions 56, 57. Accordingly, the bracket 32—33 due to the dimensional relationships of the recesses 50, 51, 52, 53 with respect to the protrusions 54, 55, 56, 57 permit the bracket to be secured to the molding in only one predetermined manner. In the event the operator attempts to assemble the bracket 32—33 in an improper manner to the molding 31, the long protrusions 56, 57 will be blocked in their movement by the short recesses 50, 51 so that the tap-off unit 30 cannot be properly assembled.

The assembly of the tap-off unit as well as the removable connection of the tap-off unit to the trolley duct is an operation which may occur very frequently within the operation of the trolley duct system, and hence, it is essential to provide a polarizing arrangement as previously described for a three wire system. As a general rule, the initial installation of the trolley duct housing 10 is made by trained personnel and is a semi-permanent structure. Therefore, the necessity of providing a positive method of ensuring that the housing assemblies are placed together in only one predetermined manner is not as urgent since it can be assumed that the trained personnel will make a proper initial installation of the system. However, it should be noted that with the asymmetrical housing arrangement seen in Figures 3 and 3a, one unit section could be connected to its adjacent unit section in only one predetermined manner thereby providing automatic polarization.

Accordingly, we have provided a novel trolley duct system for a three wire circuit wherein the tap-off unit can be assembled in only one predetermined manner and also a polarization arrangement in which the tap-off unit can be connected to the trolley duct housing arrangement in only one predetermined manner.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claim.

We claim:

A trolley duct assembly comprising a trolley duct section and a tap-off unit; said trolley duct section being comprised of a housing and at least two conductors; said conductors being carried by said housing and insulated from each other and from said housing; said tap-off unit adapted for removable locking to said housing at any one of many locations along the length thereof; said tap-off unit being comprised of a first and a second bracket and a molding containing at least two contacts; at least one of said contacts operatively positioned to engage said conductors only when said tap-off unit is locked to said housing; said housing including a longitudinally extending opening through which said contacts are entered into and withdrawn from said housing; said brackets each having a fastening portion to lock said tap-off unit to said housing; each of said fastening portions having a leg; said legs being spaced unequal distances, measured in a single plane, from a first center line of said molding; each of said fastening portions also having a foot; said feet being spaced unequal distances, measured in said plane from a second center line of said molding; said housing having a protrusion to prevent said legs from straddling said housing in any other than a single predetermined position; said protrusion comprising the furthest extension of said housing, measured in a horizontal plane, from the center line of the width of said housing opening; said fastening portions operatively constructed to prevent locking of said tap-off unit to said housing unless said legs first straddle said housing in said predetermined manner; said legs operatively positioned to prevent rotation of said tap-off unit in other than a predetermined manner when said legs straddle said housing; said feet operatively positioned to prevent locking of said tap-off unit to said housing unless said tap-off unit is first rotated in said predetermined manner; said molding having recesses of unequal depths to receive respective extensions of unequal lengths from said brackets to thereby prevent said brackets from being connected to said molding in other than predetermined positions.

References Cited in the file of this patent

UNITED STATES PATENTS

| | | |
|---|---|---|
| 1,157,026 | Meschenmoser | Oct. 19, 1915 |
| 1,718,529 | Coldwell | June 25, 1929 |
| 1,835,109 | Ayres | Dec. 8, 1931 |
| 2,158,656 | Frank | May 16, 1939 |
| 2,310,024 | Frank et al. | Feb. 2, 1943 |
| 2,536,282 | Hammerly et al. | Jan. 2, 1951 |
| 2,611,801 | Hammerly et al. | Sept. 23, 1952 |
| 2,626,301 | Hammerly | Jan. 20, 1953 |
| 2,659,874 | Veitch | Nov. 17, 1953 |
| 2,696,533 | Hammerly et al. | Dec. 7, 1954 |
| 2,725,542 | Born | Nov. 29, 1955 |